Aug. 3, 1954
G. TOURNON
2,685,128
STRETCHING REINFORCEMENTS OF CONCRETE STRUCTURES
Filed Nov. 15, 1950
10 Sheets-Sheet 1
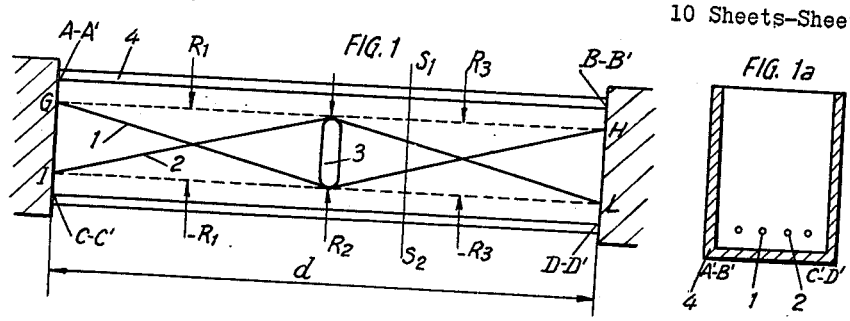
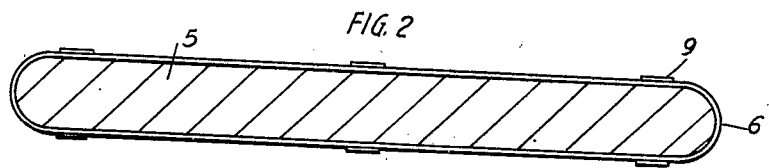
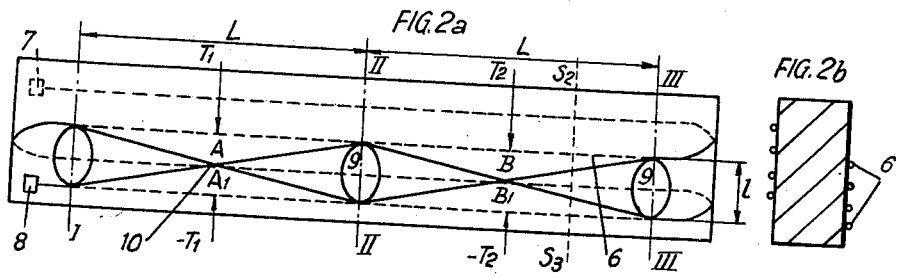
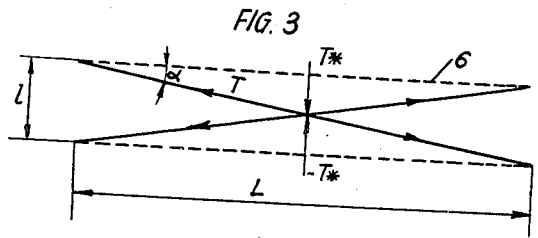
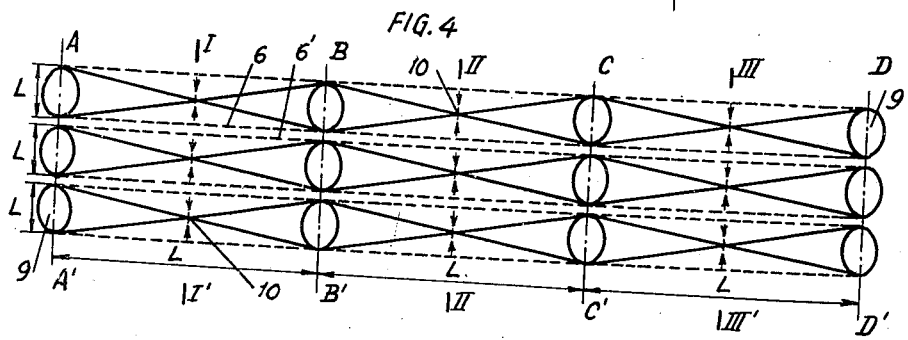
INVENTOR
GIOVANNI TOURNON
By Young, Emery & Thompson
Attys.

Aug. 3, 1954  G. TOURNON  2,685,128
STRETCHING REINFORCEMENTS OF CONCRETE STRUCTURES
Filed Nov. 15, 1950
10 Sheets-Sheet 2
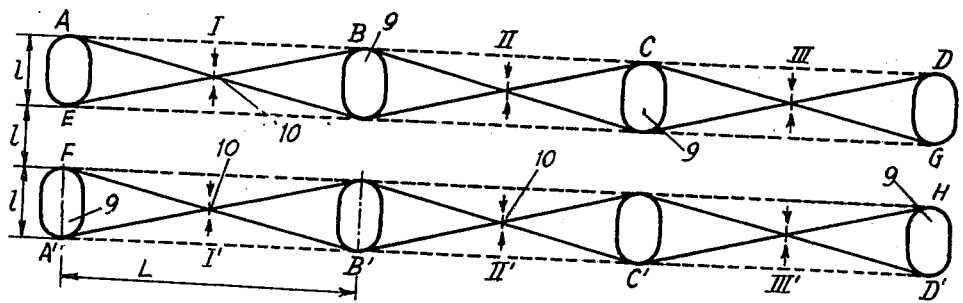
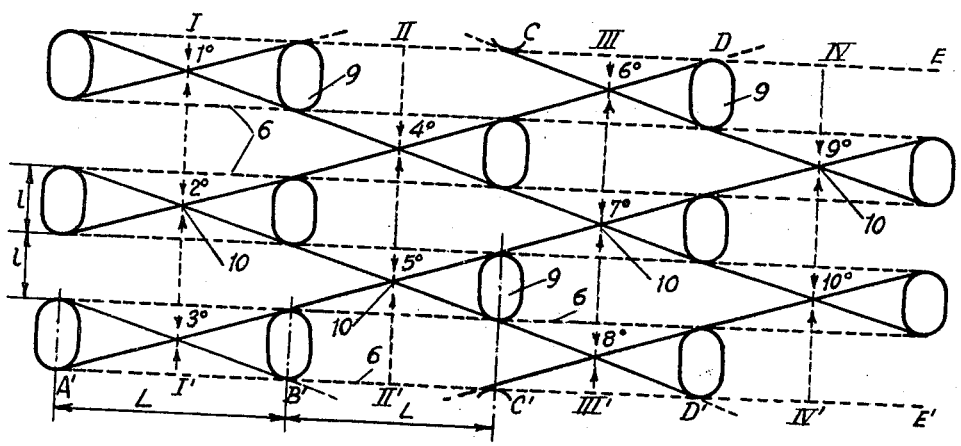
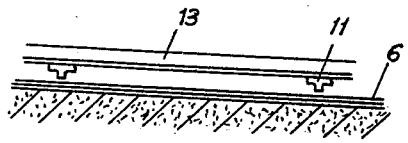
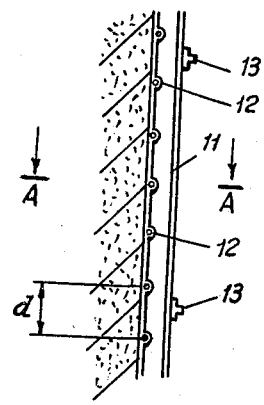
INVENTOR
GIOVANNI TOURNON
By: Young, Emery & Thompson
Attys.

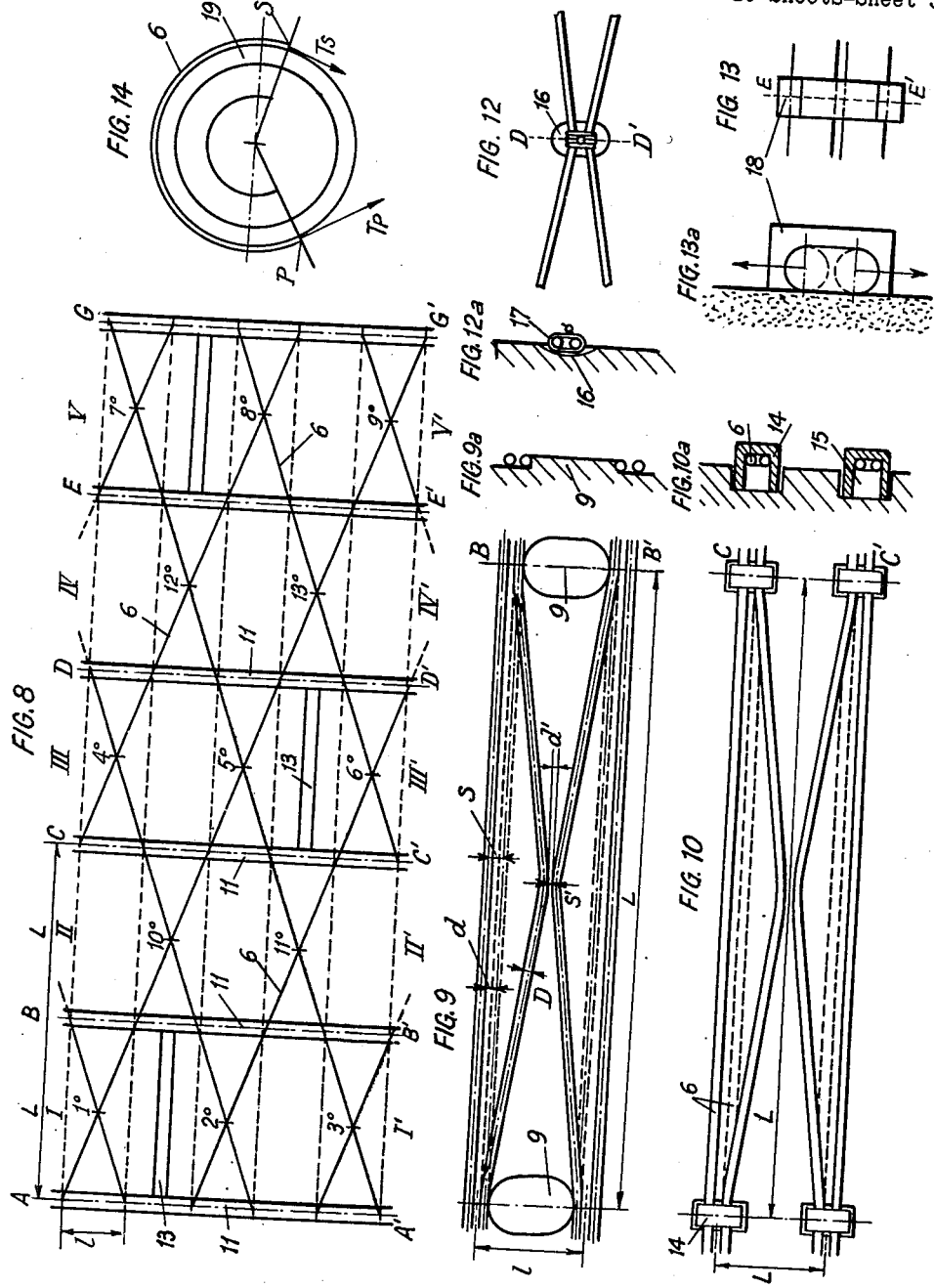

Aug. 3, 1954    G. TOURNON    2,685,128
STRETCHING REINFORCEMENTS OF CONCRETE STRUCTURES
Filed Nov. 15, 1950    10 Sheets-Sheet 4
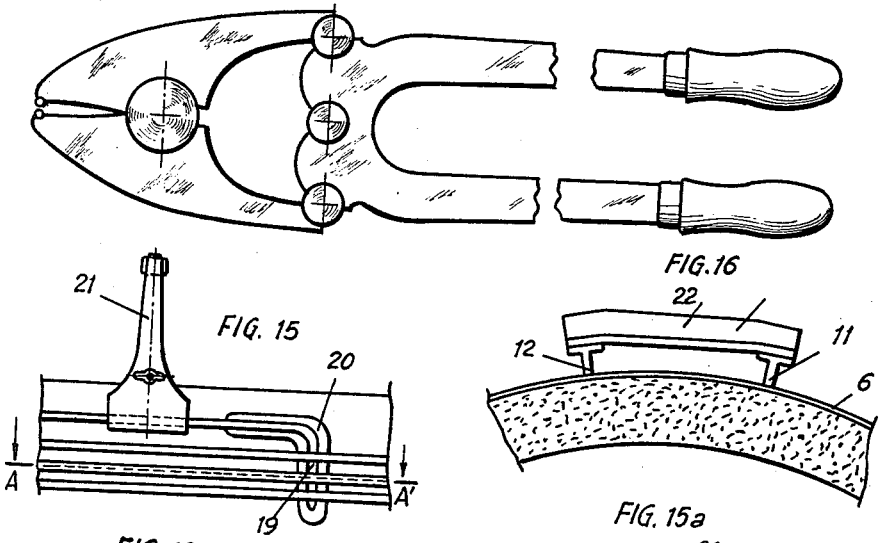
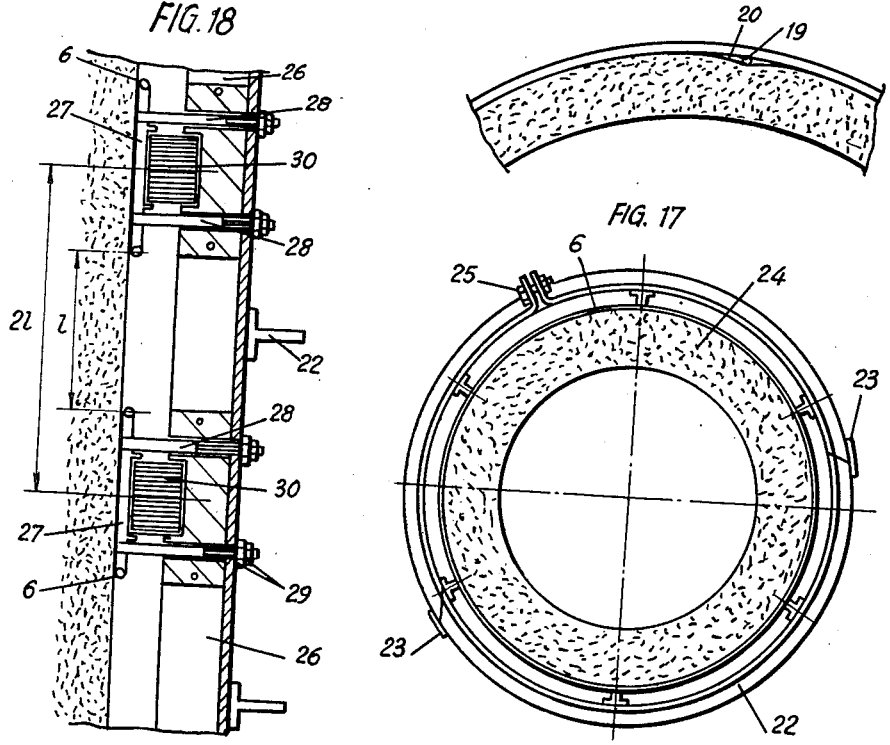
INVENTOR
GIOVANNI TOURNON
By: Young, Emery & Thompson
Attys.

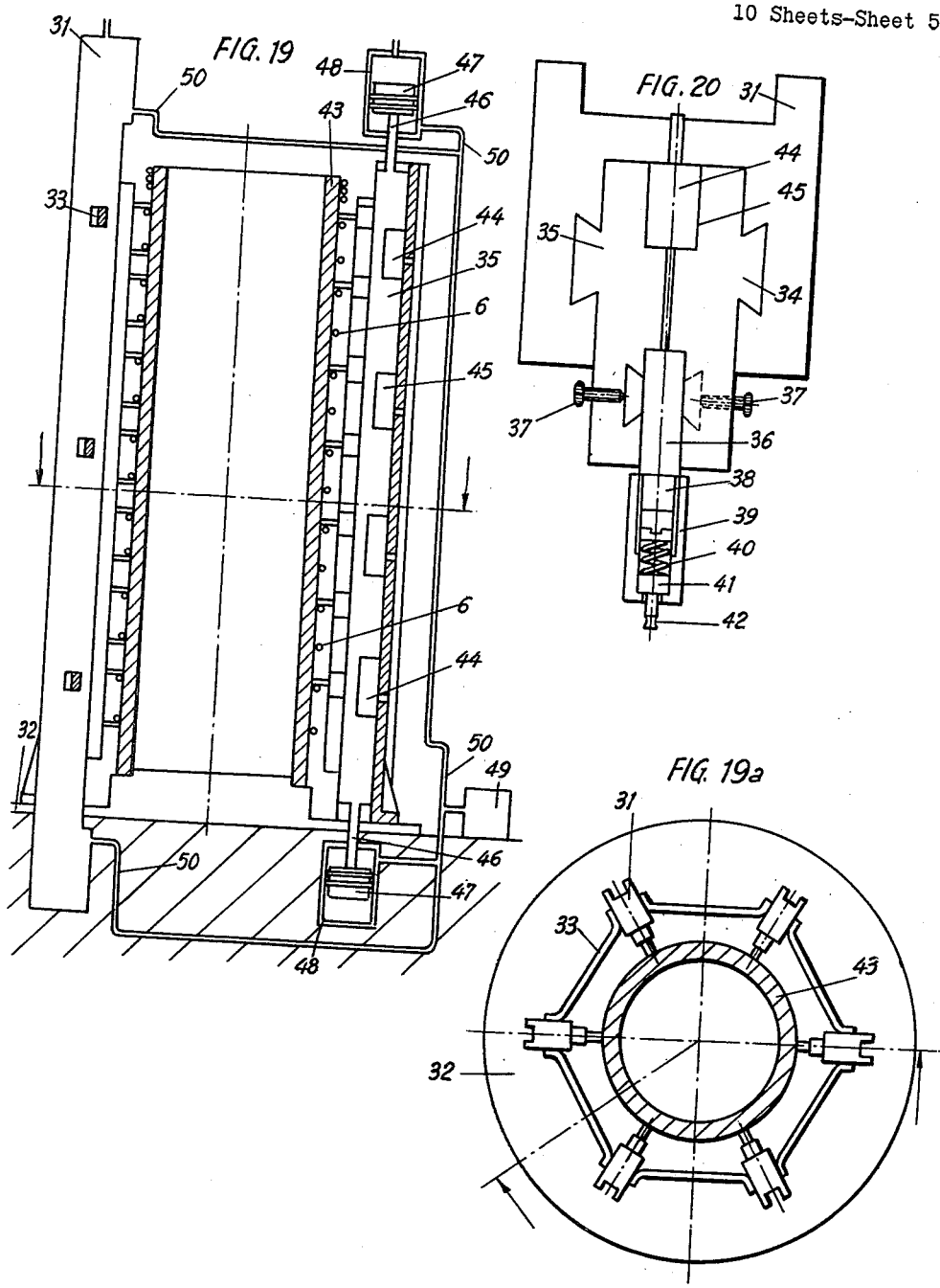

Aug. 3, 1954
G. TOURNON
2,685,128
STRETCHING REINFORCEMENTS OF CONCRETE STRUCTURES
Filed Nov. 15, 1950
10 Sheets-Sheet 6
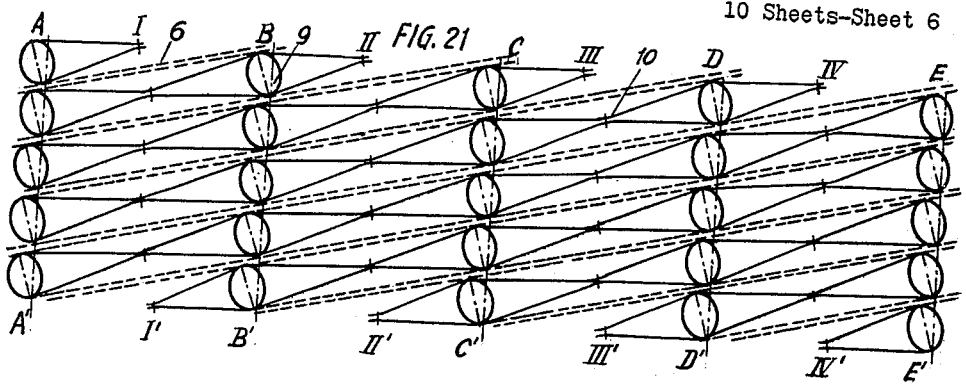
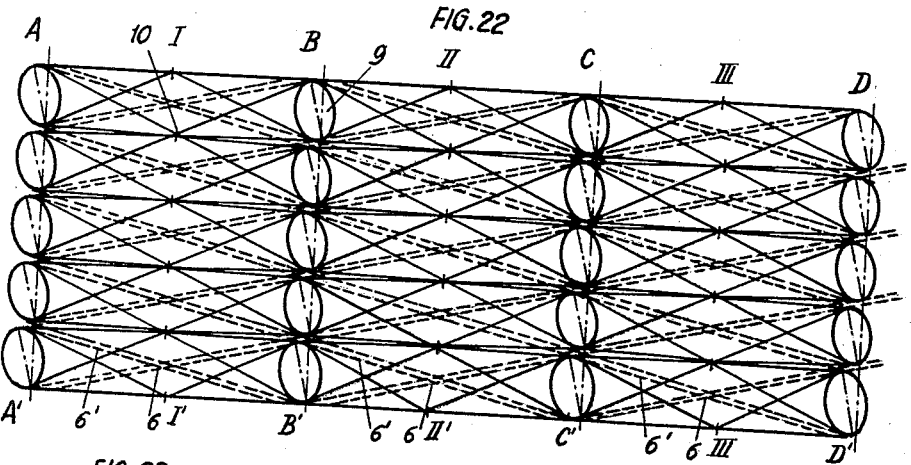
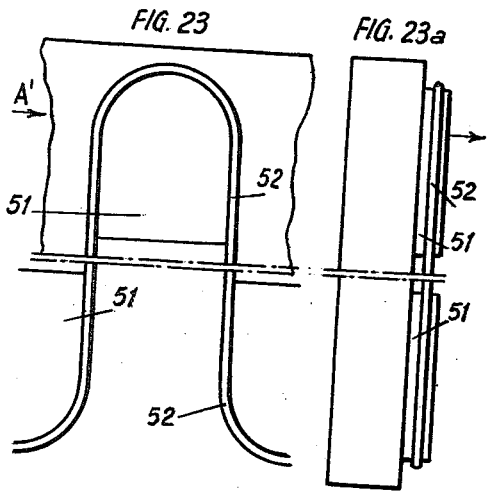
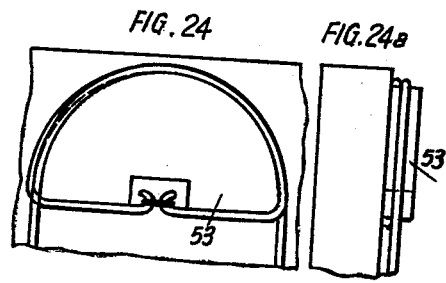
INVENTOR
GIOVANNI TOURNON
By: Young, Emery & Thompson
Attys.

Aug. 3, 1954
G. TOURNON
2,685,128
STRETCHING REINFORCEMENTS OF CONCRETE STRUCTURES
Filed Nov. 15, 1950
10 Sheets-Sheet 7
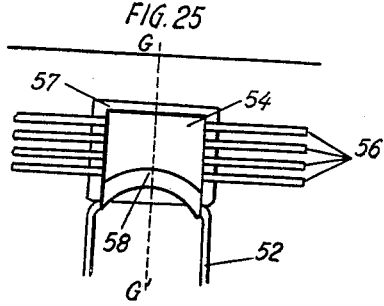
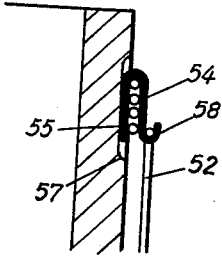
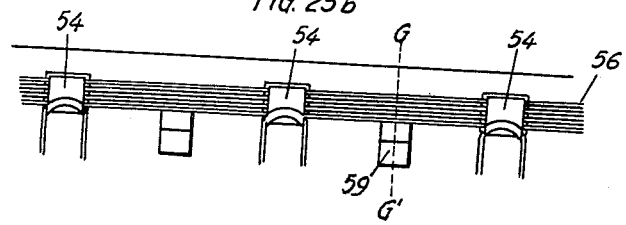
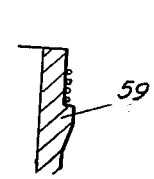
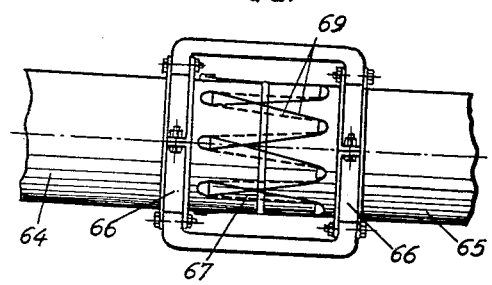
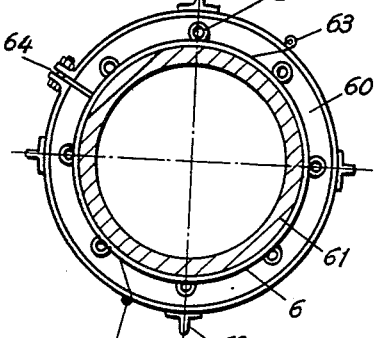
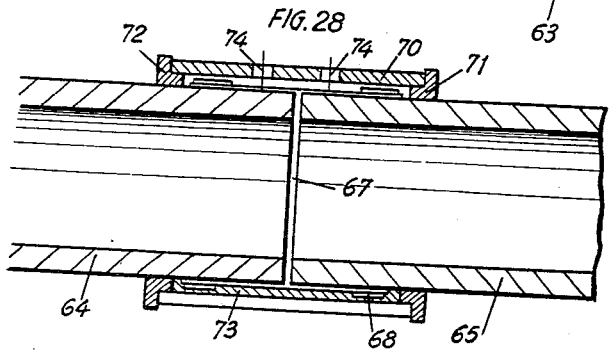
INVENTOR
GIOVANNI TOURNON
By Young, Emery & Thompson
Attys.

Aug. 3, 1954

G. TOURNON 2,685,128

STRETCHING REINFORCEMENTS OF CONCRETE STRUCTURES

Filed Nov. 15, 1950

INVENTOR
GIOVANNI TOURNON
By: Young, Emery & Thompson
Attys.

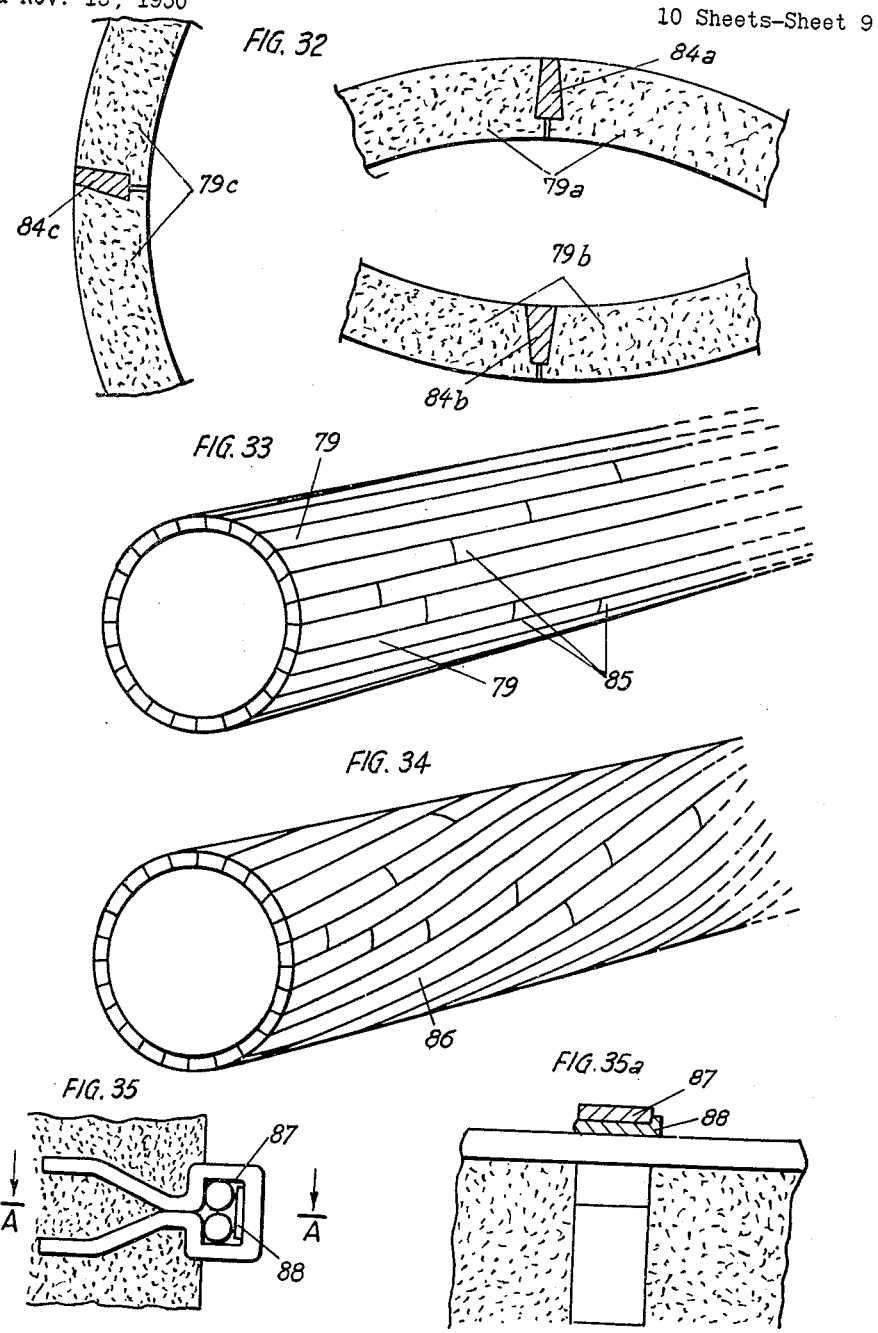

Aug. 3, 1954   G. TOURNON   2,685,128
STRETCHING REINFORCEMENTS OF CONCRETE STRUCTURES
Filed Nov. 15, 1950   10 Sheets-Sheet 10
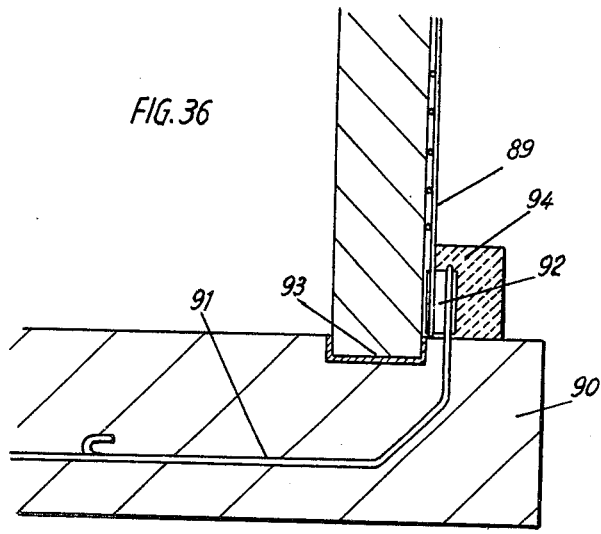
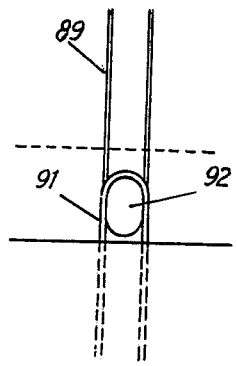
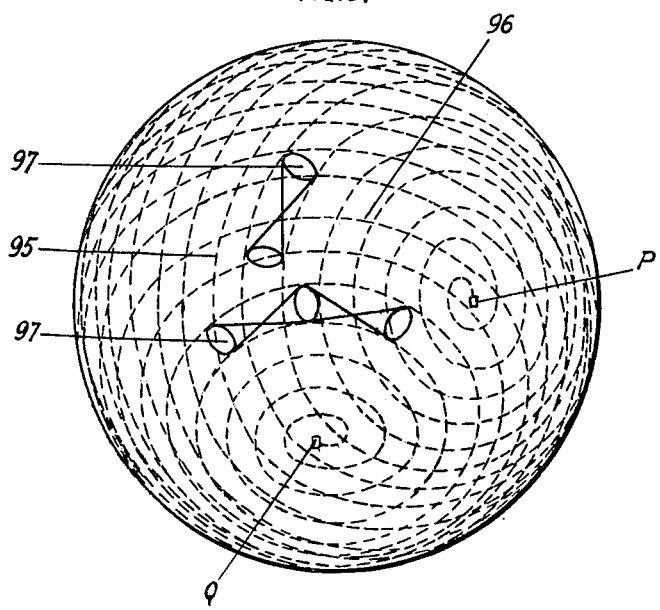
INVENTOR
GIOVANNI TOURNON
By: Young, Emery + Thompson
Attys.

Patented Aug. 3, 1954

2,685,128

UNITED STATES PATENT OFFICE 2,685,128

STRETCHING REINFORCEMENTS OF CONCRETE STRUCTURES

Giovanni Tournon, Turin, Italy

Application November 15, 1950, Serial No. 195,715

Claims priority, application Italy November 17, 1949

5 Claims. (Cl. 29—452)

This invention relates to stretching metal reinforcements, more particularly of prestressed concrete elements. The method is intended for stressing not only rectilinear reinforcements, as is easily obtained by current methods, but also curvilinear reinforcements however arranged and suitably bound.

The method is more particularly useful for stressing circularly or helically arranged iron wire, adapted to form a hooping reinforcement for hollow cylindrical concrete bodies subjected to internal pressures, such as pipes, reservoirs, silos and the like.

The method consists broadly in anchoring the reinforcing in a direction and position near its ultimate direction and position in the prestressed structure, anchoring it and acting thereupon by external forces at given points thereof, in order to elongate the middle axis of the armature.

The elongation shall be such as to produce in the reinforcement the desired tension. The external forces having stressed the reinforcement may then be replaced by proper internal or external attachments. The internal attachments connect together different points of the reinforcements, while external attachments connect given points of the reinforcement to other points external thereof. The external points may be on the concrete structure to be prestressed or on a stressing bench, depending upon whether the stressing operation is effected after hardening of the concrete or before casting the concrete.

The invention shall be described with reference to the accompanying drawings, which show diagrammatically by way of example some embodiments of the method.

Figure 1 is a plan view of the reinforcement of a concrete girder before and after stressing which is carried out before casting the girder.

Figure 1A is a section on line $S_1S_2$ of Figure 1.

Figure 2 is a plan view of a concrete girder and its reinforcement.

Figure 2a is a view of the girder shown in Figure 2, showing the position of the armature before and after stressing.

Figure 2b is a section on line $S_2S_3$ of Figure 2a.

Figure 3 is a diagrammatic view of the operation of stressing reinforcements and acting forces.

Figure 4 shows a type of reinforcement with twined wires and permanent spacers.

Figure 5 shows a second type of reinforcement with single wires and permanent spacers.

Figure 6 shows a third type of reinforcements with single wires and permanent spacers which may be replaced by temporary spacers.

Figure 7 shows a recessed metal shape serving as temporary wire spacer.

Figure 7a is a section on line AA of Figure 7.

Figure 8 shows a reinforcement arrangement similar to the third type shown in Figure 6, in which the permanent spacers have been replaced by temporary spacers of the type shown in Figure 7.

Figure 9 is a more detailed view of a reinforcing element of the first type with its wire spacing projections.

Figure 9a is a section on line BB' of Figure 9.

Figure 10 shows a reinforcing element of the first type, of which the spacing projections are replaced by U-shaped metal members.

Figure 10a is a section on line CC' of Figure 10.

Figure 11 shows a four hinge pincers employed for stressing reinforcements.

Figure 12 shows a binding of two members of the reinforcement at the point at which they are drawn most closely together.

Figure 12a is a section on line DD' of Figure 12.

Figure 13 shows a clamp adapted to secure together two members of the reinforcements at the point at which they are closest to each other.

Figure 13a is a section on line EE' of Figure 13.

Figure 14 shows the principle on which end fastenings are carried out.

Figure 15 shows an end fastening.

Figure 15a is a section on line AA' of Figure 15.

Figure 16 shows in section two spacer shapes for temporary spacing with recesses, fitted to the external surface of a cylindrical tubular structure.

Figure 17 is a sectional view of temporary recessed spacer shapes connected together as a cylindrical latticework and fitted to the external surface of a tubular structure.

Figure 18 shows a further type of temporary spacer, in which the recesses are replaced by blocks resiliently connected to metal shapes.

Figure 19 shows in elevation a machine adapted to simultaneously draw together in one step all the reinforcement wires.

Figure 19a is a plan view of the machine shown in Figure 19.

Figure 20 is a detail view of the machine shown in Figures 19 and 19a, more particularly a horizontal section of one of the machine pillars.

Figure 21 shows a special reinforcement arrangement, fit for cylindrical tubular structures, which is formed from a plurality of helices wound under a considerable inclination about the external cylindrical surface of the structure.

Figure 22 shows a modification of Figure 21, in which two systems of reinforcements, instead of one only, are employed and are wound with equal pitch but in contrary directions about the external cylindrical surface of the structure.

Figure 23 shows an end fastening for a longitudinal reinforcement member.

Figure 23a is a view from A' of Figure 23.

Figure 24 shows a special end fastening for a longitudinal reinforcement member, at which the two extreme ends of the longitudinal reinforcement are joined together.

Figure 24a is a view from A' of Figure 24.

Figure 25 shows a further type of end fastening consisting of a metal member engaging the hooping irons.

Figure 25a is a section on line FF' of Figure 25.

Figure 25b shows the reciprocal arrangement of three hook fastenings and bearing projections for the hooping reinforcements.

Figure 25c is a section on line GG' of Figure 25b.

Figure 26 shows a temporary spacer for the longitudinal armatures of cylindrical tubular structure.

Figure 27 shows a type of joint between two tubular members for stressing the reinforcement according to this invention.

Figure 28 is a sectional view of a joint shown in Figure 27 with its lining sleeve.

Figure 32 shows types of joints between the various shaped members for the manufacture of tubular structures.

Figure 33 shows the prefabricated tubular structure from rectilinear staves, more particularly with reference to the arrangement of joints perpendicular to the structure axis.

Figure 34 shows a tubular structure prefabricated from helically directed staves.

Figure 35 shows an embodiment of temporary fastening used in the manufacture of cylindrical structures by sections, such as reservoirs, silos etc.

Figure 35a is a section on line AA of Figure 35.

Figure 36 shows the basic fastening for longitudinal reinforcements for the manufacture of prestressed cylindrical reservoirs.

Figure 36a is a view from the outside of Figure 36.

Figure 37 shows the arrangement of the reinforcements for the manufacture of spherical prestressed reservoirs.

Figure 29:
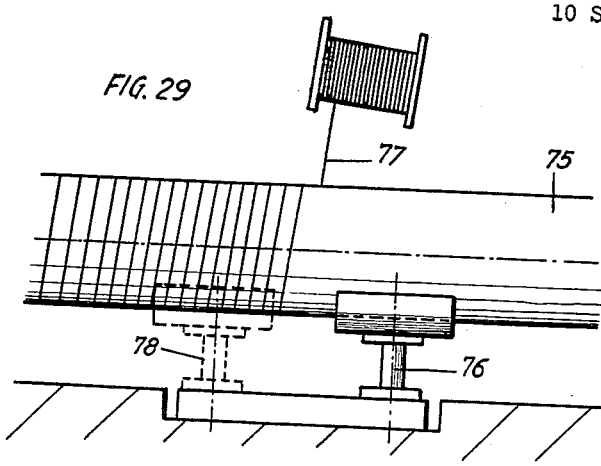
Figure 29 shows how the reinforcement is wound about a tubular structure cast on the spot and the adjustable temporary supports are replaced.

In the embodiments shown in Figures 1 and 1a it is assumed to manufacture a prismatic member ABCD—A'B'C'D', such as a girder of longitudinally prestressed reinforced concrete.

The reinforcement of said prism is assumed to be formed by two steel wires 1 and 2 of length $d$.

Prestressing of the reinforcement according to this invention is carried out before casting. For this purpose the ends of the reinforcements are secured to fixed external points GHIL, whereupon forces R1—R1, R2—R2, R3—R3 are applied. In the specification, the absolute value of the intensity of said forces may be equal for all of them and such as to produce an elongation of the middle axes of the reinforcement:

$$dl = \frac{td}{E}$$

$t$ being the unit tension to be obtained in the reinforcement, $d$ the primitive length of the reinforcement calculated between the fastening points GHIL and E the modulus of elasticity of the reinforcement. The forces R1, R2, R3 may be obtained by any known means, such as levers, screws, pliers.

When the reinforcements have undergone the desired deformation the external forces may be replaced by suitable internal fastenings. So, for instance the forces R1—R1, R3—R3, may be replaced by bindings or clamps which hold the reinforcements drawn together, while the forces R2—R2 may be replaced by suitable members, such as a hardened concrete prism, which is interposed between the reinforcements and prevents them from being drawn together.

Thereupon the concrete is cast into the mold 4 and, upon its sufficient hardening, the action of the fastenings GHIL is removed, for instance by cutting the reinforcements at these points. In this manner the reinforcements transmit by adherence to the concrete prism 7 a compression stress equalling approximately the longitudinal tension component of the reinforcements.

In order to accelerate and simplify manufacture, it may be convenient to stress the reinforcement on previously cast and hardened concrete structures.

In the embodiment shown in Figures 2, 2a and 2b, it is assumed to prestress longitudinally a prismatic concrete member 5 upon hardening. A number of steel wires 6 are arranged along the walls of said members. The wires may be parallel to one another and be fastened at their ends to the concrete member to be prestressed or, more conveniently, they may be formed from a helical winding of a single or double wire about the member to be prestressed. In this case, the wire is fastened to the concrete member merely at the free ends 7 and 8 of said helix. The ends of the concrete prism are then conveniently rounded according to half-circles as indicated in Figure 2. The wires are stressed by causing them by the action of external forces of proper characteristics to assume a direction according to a broken line.

In the broadest case, the sizes of the members to be prestressed and the distance between two contiguous wires are such as to obtain a prestressed broken line having a plurality of apices for each initially rectilinear wire member. It may therefore be convenient for a certain number of points of the wires to be fastened to the member to be prestressed, in order to prevent displacements perpendicular to the direction of the wire at the respective points.

This may be carried out by providing on the concrete member a certain number of spacer projections 9 suitably arranged in order to prevent locally the wires from being drawn together.

The reinforcement may then be stressed by drawing together the points AA₁, BB₁ of two contiguous wires by means of external forces T₁—T₁, T₂—T₂; said points AA₁, BB₁ being the middle points between two successive spacer projections. Said points are then blocked by means of a binding 10. By referring to the distance (Figure 3) between two successive spacer projections as L and the spacing between two contiguous wires of the reinforcement as $l$, a prestressing of a value $t$ may be obtained, if the following ratio exists between L and $l$:

$$\left(l+\frac{l^2}{L^2}\right)^{\frac{1}{2}}-l=\frac{t}{E}$$

By referring to the value of the ratio $l/L$ as $k$:

$$k=\frac{l}{L}=\left[\left(\frac{t}{E}+1\right)^2-1\right]^{\frac{1}{2}}$$

$E$ being the modulus of elasticity of steel.

If tension of 80 kg./sq. mm. is desired, and $E=21,000$ kg./sq. mm.

$$k=\frac{l}{L}=\left[\left(\frac{80}{21.000}+1\right)^2-1\right]^{\frac{1}{2}}=0.08737$$

The value of the angle $a$ comprised between the axis of the wire in its primitive position and the axis of the wire after stressing will be $$a=\text{arctg } 0.08737 = 4°59'36''$$

This meets the ideal assumption that the wires are of zero cross size and are brought to a perfect contact with one another.

In reality, if it is desired to maintain the mean value of the angle of inclination $a$ unvaried, the practical value of the $k$ ratio shall be slightly greater than the one calculated above, for the two circumstances referred to cause part only of the spacing $l$ between two contiguous wires to be utilised from the stand point of stressing.

For instance, if the reinforcement is in the form of steel wires of .5 mm. diameter, this ratio $k$ may go other from the theoretical value of 0.08737 to the practical value of about 0.134.

By referring to the external force perpendicular to the wire axis, which it is necessary to apply for obtaining a tension stress $T$ in the wire as $T$, $$T=2T \text{ sen } a=2T \text{ sen } 4°59'36''=2T0.0873=T0.1746$$

It is therefore sufficient to apply an external force of the order of $\frac{1}{10}+\frac{1}{5}$ that to be obtained in the armature for setting up said reinforcement a tension of 50+100 kg./sq. mm. Whether the wires are parallel and fastened at their ends, or they are formed from a helical winding of a single or twined wire, they may be arranged and stressed according to either of the diagrams and methods described hereafter.

The first method (Figure 4) consists in arranging the reinforcement by pairs of two wires 6, 6' drawn together and extending between projections adapted to prevent transverse movements of the points of the wires situated on the alignments AA', BB', CC' between which the spacing is L. The wires are stretched by drawing together and blocking at 10 the points of the wires arranged along the middle line alignments I—I', II—II' between two successive vertical projection rows.

The second method (Figure 5) consists in arranging single wires parallel to one another and stretching similarly to the previous method. The points on the wires belonging to the alignments AA', BB', CC', between which the spacing is L, are kept in positions by spacer projections 9, similar to the previous one, and the reinforcement is stressed and kept in this condition by drawing together the points of the wires situated along the alignments I—I', II—II' etc., and thereupon blocking them.

This process implies a certain discontinuity in prestressing for upon completion of this step the strips EFGH on the prestressed member are deprived of reinforcement.

The third system (Figure 6) consists in arranging individual wires parallel to one another as in the second method, and in setting up the desired tension by the displacement of the middle points between the alignments AA', BB', CC' etc., of the projections alternately upwardly and downwardly. In this case with an individual wire reinforcement the discontinuity in prestressing ascertained in the second type of reinforcement is avoided. If the steps of drawing together and blocking the wires are carried out individually in a given order, for instance as indicated in the drawing by numerals 1°, 2°, 3° etc., an equal number of points of drawing together and blocking the wires implies a number of projections arranged as shown in the drawing required according to the first and second methods.

It is clear that by the third method the function of the spacers differs from the function performed by them in the first and second methods. In the latter two cases, the function of the projections is a permanent one, for they further retain after prestressing has been completed. According to the third method, the retaining function of the projections is merely a temporary one, for on completion of prestressing the prestretched reinforcements are tangential to the projections at which their direction is exactly a rectilinear one. This means that, instead of adopting projections on the wall of cementitious conglomerate, temporary spacers may be employed. The latter (Figures 7 and 7a) may simply consist of steel shapes 11, such as T shapes, in the flange of which recesses 12 receiving the wires 6 are formed. The spacing $l$ between two contiguous recesses equals the pitch of the reinforcement, and their width and depth, but slightly exceeds the diameter of the wires to be stretched. These recessed shapes are rigidly connected two by two by cross shapes 13, with a spacing L between them equalling the spacing between two successive rows of fixed points. The assembly of two recessed shapes by means of cross shapes results in a metal lattice work, three of which are normally sufficient for solving all prestressing problems. Upon fastening (Figure 8) the lattice work I° in such manner that the axes of the two recessed shapes coincide with two successive rows AA', BB' of fixed points, prestressing of the underlined reinforcement section and blocking of the wires at the points 1°, 2° and 3° may be proceeded with. The lattice work II° is then fastened in such manner that the axes of its recessed shapes register with the successive rows CC', DD' of fixed points, and the wires are stretched over the reinforcing sections between said rows CC', DD' and blocked at the points 4°, 5°, 6°. The third lattice work is then fastened in such manner that the axes of its recessed shapes register with the rows EE', DD', and the respective reinforcement sections are stretched and blocked at the points 7°, 8°, 9°. The reinforcement sections between the rows BB', CC' and DD', EE', respectively, may then be stretched and blocked at the points 10°, 11°, 12°, 13°.

The second lattice work may now be removed and utilised for the successive stretching steps, whereupon the third lattice work is removed and re-utilised, and so on till the whole reinforcement is stressed. If the steps of drawing together and blocking the wires are effected all simultaneously, temporary spacers may fully be dispensed with, which results in a further simplification and acceleration in manufacture, as will be seen more in detail from the description of this method in connection with prestressing of cylindrical structures of circular section.

Besides the above mentioned diagrams and arrangements of reinforcement and manners prestretching, further methods may be developed, for instance by combining two or more diagrams as have been described above, without departing from the scope of this invention. The above mentioned manners of prestretching reinforcements may be suited to the specific cases and solve any possible problem of prestressing structure of cementitious conglomerate. More particularly, the method will be extremely useful for prestressing structures cast on the spot, such as girders, slabs, reticulated structures, etc., for the forces to be applied are relatively moderate and the necessary equipment is very simple and handy. As mentioned above, one of the main advantages of this prestressing method is the possibility of stretching to the desired pitch reinforcements arranged over convex curved surfaces of any elaborate form.

In practice, the possibility of stretching hooping reinforcements of cylindrical structures of circular sections, such as pipes, reservoirs, piezometric towers, silos etc. is of the greatest importance.

It is clear that in these structures which are mainly subjected to internal pressures, prestretching of the reinforcement and consequent prestressing of the concrete affords the greatest static and economic advantages. Manufacture of said structures of ordinary concrete without prestressing necessarily implies a very poor utilisation of the mechanical properties of steel. In fact, it is difficult to cause steel to operate at tensions exceeding at 2+3 kg./sq. mm. without cracking of concrete. On the other hand, none of the methods employed heretofore for prestressing said hollow cylindrical structures of circular section is exempt from constructional complications or from intrinsical drawbacks which are so serious that their use appears problematic, if not prohibitive.

According to this invention, streaching of the reinforcements, whether in the form of hooping or longitudinal wires, becomes a very simple step and such that it may be carried out by one worker only with an elementary equipment. The cylindrical surface is provided with a metallic reinforcement, whether in the form of hooping or longitudinal wire, according to either of the three above described diagrams.

Referring now exclusively to the hooping wire, if an arrangement of the reinforcement according to the first type is desired, the ends of two distinct steel wires are fastened to one end of the cylindrical structure to be prestressed. Said wires are wound by pairs about the cylindrical surface along an helix of such pitch to form the necessary metallic section; assuming $l$ denotes said pitch (Figs. 9 and 9a) if D is the diameter of the wires 6, S the spacing between the axes of the two contiguous wires, $d=S-D$ the spacing between their surfaces, S' the spacing at which they the axes of two wires at the point at which they are closest together upon pre-stretching, $d'=S'-D$ the minimum spacing between their surfaces, the total effective pre-stretching chamber $l$ will be $$l^* = l - D - \frac{d}{2} - \frac{d'}{2}$$

by referring to the ratio of $l^*/L$ as $k$, wherein L is the spacing between two successive fixed points of the wire $$L = \frac{l}{k}\left(l - D - \frac{d}{2} - \frac{d'}{2}\right)$$

In order to prevent longitudinal displacements of the wires at the rows of fixed points, between which the spacing is L and is measured on the external surface of the cylindrical body, projections 9 of convenient form and position are provided on said surface, between which the wires extend. The said projections are also very useful as spacers for the successive helices on winding of the wires on the cylindrical surface. The projections (Figures 10 and 10a) may be replaced by U-shaped clamps which encircle a pair of wires and of which the ends are received by recesses 15 conveniently formed in the surface of the cylindrical structure on casting. Drawing together of the points of the wires situated along the middle generatrices between two successive rows of fixed points is easily obtainable by an ordinary mechanical means.

Four hinge pliers of the type shown in Figure 11 have been found particularly useful for the purpose. Upon bringing into contact the two wires, they may be fastened by any method, for instance by binding, Figure 12. In this case it may be convenient to provide at the connecting point of the two wires a slight recess 16 in the concrete wall in order to facilitate passage of the binding 17 underneath the reinforcements.

Clips 18 obtained by cutting have given excellent results thanks to the simplicity and rapidity of carrying out the blocking step. The form and position of the clips to the wires is shown in Figures 13 and 13a. According to the size of the reinforcements (wires or cables) the said clips may be obtained by cutting or casting. The blocking step then merely consists in bringing the wires into contact by means of the pliers, in introducing the clip 18 so that it encircles the wires and, finally, in releasing the pliers so as to transfer to the clip the effort of reciprocal drawing apart of the wires.

It has already been explained that the moderate external forces set up in the reinforcements traction stresses are very important. In fact, it has been mentioned that to obtain in the reinforcements a tension of 80 kgs./mm.$^2$, the ratio between the external force and the resulting traction stress in the reinforcement takes the value of 0.1746. Referring to the case of steel wire of 5 mm. diameter the traction stress to be obtained in the reinforcement becomes $$\times \frac{5^2 \cdot 3.14}{4} \cdot 80 = 1570 \text{ kgs.}$$

Consequently, in this case, an external force of $1570 \times 0.1748 = 274$ kgs. will be sufficient. If a pliers is used for setting up this stress which multiplies by 20 the force exerted, it will be sufficient to apply the very moderate force of 13.7 kgs.

The end fastenings of helical reinforcements to the tubular structure are effected by utilising the fact that in a wire 6 wound on a cylindrical surface of circular section 9 (Fig. 14), subjected to a traction stress $T_P$ at a point P, the traction decreases on drawing away from the point P according to an exponential law which is characterized by the expression:

$$T_S = T_P e^{f\theta}$$

wherein $T_S$ is the balancing traction stress at a point S such that the arc PS is subtended by the centre angle $\theta$, and wherein $f$ is the coefficient of friction existing between the steel reinforcement and external surface of the cementitious conglomerate. The value of the friction coefficient during movement between the steel and cementitious conglomerate may vary according to the superficial state of the concrete and steel from minimum values of 0.20 to maximum values of 0.55. Since friction on detachment may be considered lying between 1.5 and 3 times the friction coefficient during movement it may be safely assumed that the value of the friction coefficient $f$ is 0.25. Under these conditions the value of $e^{f\theta}$ equalling $\frac{T_S}{T_P}$ is 1.48 with $\theta = \frac{\pi}{2}$ 2.19 with $\theta = \pi$; 4.78 with $\theta = 2\theta$; 22.91 with $\theta = 4\pi$, 111 with $\pi = 6\pi$.

In the case of a 5 mm. diameter reinforcement subjected to a tension of 80 kg./sq. mm., three turns about the cylinder are sufficient for reducing the initial traction stresses equalling $$\frac{5^2}{4} \cdot 3.14 \cdot 80 = 1570 \text{ kgs.}$$

to a value of $$\frac{1570}{111} = 14 \text{ kgs.}$$

which may very easily be absorbed by an end fastening. In order to carry out this type of fastening the ends of the wires (Fig. 15) are bent at right angles over a section 19 of 5+10 cm. and are received by a groove 20 formed in the outer wall of the tubular structure, slightly less deep than the wire diameter. The wire may be temporarily secured to the pipe wall by means of an ordinary vise 21 and then be helically wound with a pitch but slightly exceeding the wire diameter over the three or more turns necessary for blocking. The various helices extend successively on the end of the wire bent at right angles and by compressing it against the wall of cementitious conglomerate (Fig. 15a) contribute to blocking. After the said turns serving for the end fastening, the wire takes its normal inclination. It is convenient to provide an initial inclination, hence a pitch of the helix slightly exceeding the normal ones, in order to obtain from the very first turns the desired tension notwithstanding the slight yielding which may be due to the resilient deformation of said fastening turns.

In certain cases it may be convenient to effect winding and prestretching of the hooping wires according to the third general diagram described above (see Figure 5). The armature is wound in this case about the tubular structure according to a single helix of suitable pitch. Its end fastening may be of the above described type. As already mentioned, by following this diagram it is possible to fully or partly dispense from the spacing action of the projections 9 in the surface of the tubular structure (see Figure 9) and replace it by the action of temporary spacers, acting only during prestretching of the reinforcement. These spacers (Figure 16) are wholly similar to those described and illustrated in Figure 7, that is, they consist of shapes 11 provided with recesses 12 receiving the steel wires 6 at the rows of fixed points. These shapes may be connected two by two by means of further cross shapes 22 to form cylindrical lattice work instead of plane lattice work. The use of this lattice work is similar to that described in connection with plane lattice work in the above described general case shown in Figure 8. It is often convenient in series manufacture of pipes to arrange simultaneously about the pipe 11 all the necessary lattice work for prestretching the reinforcements. In this case the lattice work may be connected together (Figure 17) by means of hinges 23 and tightened about the pipe 24 by means of a screw closure 25 or a spring.

When the outer surface of the pipe is not quite smooth the recessed shape may not be in contact with said surface over all its length. This drawback may be remedied by deplacing (Figure 18) the recess shape of the above described type by other steel shapes 26, carrying at intervals equalling twice the reinforcement pitch 1 blocks 27 resiliently connected thereto by means of the two rods 28, adjusting nuts 29 and rubber block 30. By virtue of this resiliently deformable member, when the shape 25 is forced against the cylinder wall, the blocks 27 match the latter accurately and are therefore in a condition to serve as temporary spacers for the reinforcements. By following this procedure, it will be sufficient to employ, besides the temporary spacer, a number of fixed permanent spacers, equalling the number of fixed points of the two end helices. These permanent spacers, which are always in a small number, may be in the form of protections on the pipe wall, or of metal members of the type shown in Figure 10 and denoted by 14. These U-shaped members encircle the wire and their ends fit within recesses in the pipe wall.

When the wires are simultaneously drawn together and blocked for all the helices belonging to a given section of the structure, even temporary spacers may be dispensed with, with an economy in work and time. All the reinforcing helices may be simultaneously stretched by means of an equipment shown in Figures 19, 19a and 20, consisting of a number of tough hollow columns 31 of steel shape equalling the number of rows along which the hooping reinforcements are drawn together. The columns are rigidly connected together, since they are held at their lower ends in a single steel base 32 and are further connected together by struts 33. Two steel rods 34 and 35 move axially within the columns (Figure 20) and are in turn provided with dovetail guides engaging slides 36. The latter may be secured at any height to the steel rods 34 and 35 by means of set screws 37. The screw-threaded ends 38 have screwed thereon sleeves 39 variable in length according to the outer diameter of the tubular structures to be prestressed. A spring 40 within the sleeves applies a certain pressure on the member 41, of which the end 42 in the form of a circular hook is pressed against the wall of the tubular structure 46 to be prestressed. The rods 34 and 35 are spaced by a number of toothed cylinders 44, of which the teeth are engaged by a flat set of teeth 45 cut in the inner surfaces of the rods 34, 35, but slightly exceeding in length the half-pitch of the helix formed by the inforcement winding. The toothed cylinder 44 and sets of teeth 45 cause the movements of the rods 34, 35 to be always equal in absolute value, but of contrary direction.

Stretching of the reinforcements is effected by acting on the slides 36 and sleeves 39 and bringing the two projecting rods 34, 35 in contact with the wires 6 to be stretched, moving the rod 34 upwardly and rod 35 downwardly till the wires 6 are brought into contact. The wires are then blocked together at all their contacting points, whereupon the rods 34 and 35 are brought back to their primitive position. The displacement of the rods 34, 35 is carried out hydraulically in the following manner. The rod ends extend into the axes of two pistons tightly moving within two cylinders 48 secured to the opposite ends of the columns 31. A pressure fluid is supplied to the cylinders by means of a single pump 49 and a system of conduits 50. On actuation of the pump, the fluid pressure acts on the inner faces of the pistons and cylinders and stretches the rods 34 and 35, compressing the columns 31 perform the desired displacement of the rods and simultaneous stretching of all the helices forming the hooping wire. The pump may be replaced by compressed air bottles acting through a fluid such as viscous oil on the above mentioned cylinders and pistons. The forces required for displacing the rods 34, 35 may be applied, instead of by an hydraulic device, by a motor action on the rods through gearings.

The hooping reinforcements according to this invention produce besides the desired radial prestressing of the concrete a certain prestressing in a longitudinal direction owing to the inclination taken by the armatures in their final position and friction between the reinforcements and concrete. The value of said longitudinal prestressing may be increased by enlarging the angle of inclination and pitch of the reinforcing helices, which, instead of being a single, may be a multiple wire. However, this does not imply a larger number of end fastenings, for the same wire may be wound anti-clockwise upwardly and clockwise downwardly. The mutual arrangement of the wires and stretching are carried out by one of the three general methods described. By the first method, the arrangement of the reinforcement before and after stretching, shown in dash and full lines respectively, is of the type shown in Figure 21, which illustrates a section of the outer surface of the pipe developed on a plane. A further improvement of the mechanical properties of the structure may be obtained by employing, instead of a single system of helices wound in the same direction, a double set of helices, wound to the left and right respectively. In this case one system of helices is laid and stretched before winding and stretching the second set. Figure 22 shows a section of cylindrical surface developed on a plane with the left-handed and right-handed helices 6, 6' in their positions before and after stretching in dash and full lines respectively. This case does not either necessitate increasing the number of end fastenings, for the same wire may be wound on the cylinder upwardly and downwardly always in the same direction and with an inclination of the same absolute value. The sign of the inclination is reversed every time the wire passes at the ends of the pipe to be prestressed. An arrangement of two sets of multiple helices wound to the left and to the right on the pipe will therefore be merely apparent. The references in Figures 21 and 22 have the same meanings as in Figures 5 and 6. By suiting the pitch and number of helices, it is possible by these processes to carry out by a helical reinforcement only, radial and longitudinal prestressing in any desired ratio to each other, going over from almost solely radial prestressing with very small angles of inclination, to high longitudinal prestressing with relatively large angles of inclination.

In some cases, it may be convenient to carry out longitudinal prestressing by a system of reinforcement distinct from the system for radial prestressing. This system of reinforcement is superposed to the hooping wires and, since it is rectilinear in the longitudinal direction of the pipe, it may be stretched by any known means. More particularly, these reinforcements may be arranged and stretched by any of the three general methods described above. The fastenings of these longitudinal reinforcements to the ends of the pipe section to be prestressed may be carried out (Figures 23 and 23a), by means of U-shaped projections 51 formed on casting the outer pipe surface. The reinforcement is wound to and fro about these projections from one pipe end to the other. The ends of the steel wires may be anchored in the manner described in connection with the fastenings of the hooping wire, that is by winding over a plurality of turns the wires about the cylinder, or by binding as shown in Figures 24 and 24a at a special anchoring projection 53. The semicircular projections on the outer surface of the concrete may in certain cases be replaced by pressed sheet metal members 54 in the form of a double hook, which engage on one side at 55 the reinforcement for the end fastenings. Recesses 57 are formed in the pipe wall at the position which shall be occupied by the hooks 54 for receiving the upper arm of the hook 55 between the outer surface of the pipe and reinforcements. The longitudinal armature is wound to and fro from one pipe end to the other about a further hook 58 of semicircular form. In order to prevent any longitudinal displacement of the hooping fastening wires under the action of the stresses transmitted by the longitudinal armatures on stretching, projections 59 are provided beside the position occupied by the hook on the pipe surface for bearing the reinforcements.

The third method (Figure 8) is more particularly suited for stretching this type of reinforcement. In this case (Figure 26) the temporary spacers for the wires 52 consist of recessed shapes 60 in the form of hoops coaxial with the cylindrical structure 61 to be prestressed. The assembly of hoops connected together by longitudinal shapes 62 results in a cylindrical lattice work, which may be opened by means of a number of hinges 63. The lattice work may be closed in the desired position about the pipe to be prestressed by means of a screw member 64. Longitudinal prestressing may thus be carried out by utilising the simple mechanical equipment employed for radial prestressing.

Upon stressing the hooping reinforcement as well as the longitudinal ones, they shall be protected against external agents by a coating of any suitable material, which is generally formed by means of a supplementary casting of cement mortar on the reinforced outer pipe surfaces, which is carried out by suitable spray apparatus (cement-gun, gunite) or by means of a metal mold of which the inner radius is greater than the outer radius of the overall size of the reinforcement by an extent equalling the thickness of the minimum coating desired on the reinforcement. The prestressed pipe is introduced into the mold and the lining is cast preferably on a vibrating table, in order to efficiently fill all the spaces with mortar. In order to prevent any capillary crack of the lining owing to shrinkage and afford an improved water-proofness of the lining, it may be convenient to wind about the lining one or more layers of wire net with square meshes of 0.5+1 cm. per side (wire diameter of the order of 0.5 mm.). The net is fastened by means of binding wires to the prestretched reinforcements in order to hold in position as the lining is applied. A similar method of longitudinal prestressing may be utilized for jointing the pipe sections. Figure 27 shows the ends of two pipes 64, 65. In order to joint them together, the extreme ends of the pipes are drawn towards each other at a distance varying from a few mm. to 1+2 cm. according to the pipe diameter and thickness. The two tubular structures 64, 65 are then fixed together in the proper position by means of a double clamp 66 and cement mortar is cast between their extreme faces at 67. On part hardening of the casting after 12 to 30 hours according to the kind of cement, the joint is prestressed by winding the reinforcement 69 about suitable projections 68 on the outer surfaces or about a number of hooks as shown in Figure 25 fixed to the hooping wires, and stretching the reinforcements by drawing together the wires, as shown in full lines. The mortar layer between the extreme pipe faces is thereby prestressed longitudinally, which implies a radial prestressing, considering the small thickness of the joint with respect to the two cross dimensions and the considerable values attained by the adherence and friction with the outer pipe faces. Considering that prestressing takes place when the mortar of the joint is still capable of considerable plastic deformation, it will be realized that this type of joint affords excellent properties from the standpoint of waterproofness. Conversely to other types of joints, it affords a fully monolithic structure of the various pipe sections and excellent properties under secondary stresses (traction, bending, shearing). The reinforcements utilised for the joint are protected against outer agents by means of the lining of cement mortar or gunite carried out in the above described manner. Protection may be obtained (Fig. 28) by means of a sleeve of a non prestressed or, better prestressed reinforced cementitious conglomerate, slightly exceeding in bore the maximum length of the overall size of the prestressed joint reinforcement. The sleeve is accurately held in position with respect to the pipe by means of two metal rims 71, 72 which, besides prevent overflow of the mortar cast in the clearance 73 between the sleeve and pipe through holes 74 in the upper sleeve portion, possibly vibrating. This joint is very inexpensive and durable, for it avoids any resilient packing. It will be obvious however that any type of joint, such as the Gibault joint, ordinarily employed for steel or fibrocement pipes, may be conveniently employed for prestressed concrete pipes according to this invention.

A further essential advantage is the possibility of effecting radial and longitudinal prestressing of concrete pipes cast on the spot of any length, even if they are a distance from the ground of a few decimeters, that is the minimum height permitting winding of the steel wire about the pipe. This is particularly useful in the case of large diameter pipes to be manufactured in regions in which transport and laying of refabricated elements of considerable volume and weight would imply serious technical and economical difficulties. In this case (Fig. 29) the pipe 75 is manufactured by successive sections by means of disassembleable metal molds which may be reutilised. The pipe is provided with a longitudinal metal reinforcement to ensure strength against bending and shearing stresses due to the weight of the structure and is supported at intervals of the order of 5 to 10 m. according to the characteristics of the pipe on supports 76 adjustable by means of screws, wedges, jacks or other known means. Upon manufacture and dismantling falsework of a certain pipe section after hardening, the hooping helical reinforcement is wound thereabout in various manners according to the pipe characteristics, especially according to the free space between the outer pipe surfaces and the level of surrounding ground. The steel wire is wound up to a support 76, a fresh support 78 is placed beside the support 76 on the side on which the wire has been wound. By acting on the adjusting members for the support 78 almost the full load is transferred thereon, whereupon the support 76 is removed and winding is proceeded with further.

The reinforcement is stretched in an easy manner by any of the above described systems for prefabricated pipes, and supports may be moved further in the manner described above for stretching the turns at the nest support 78.

Longitudinal prestressing of the pipe cast on the spot does not meet with special difficulties, for reinforcements are rectilinear, and is carried out similarly to prefabricated pipes. As the supports for the longitudinal reinforcements involving the lower pipe fibers are reached, the same steps described for placing the hooping reinforcement at said supports may be repeated.

Figure 30:
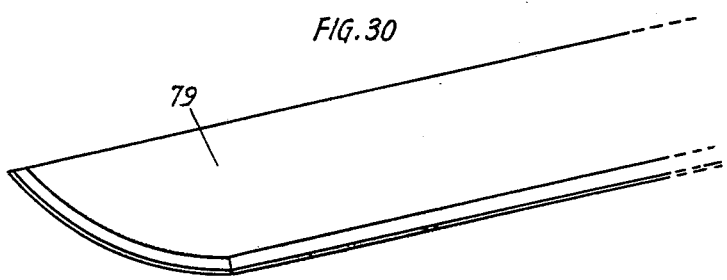
Figure 30 shows a stave-shaped member for the manufacture of prestressed prefabricated tubular structures.
Figure 31:
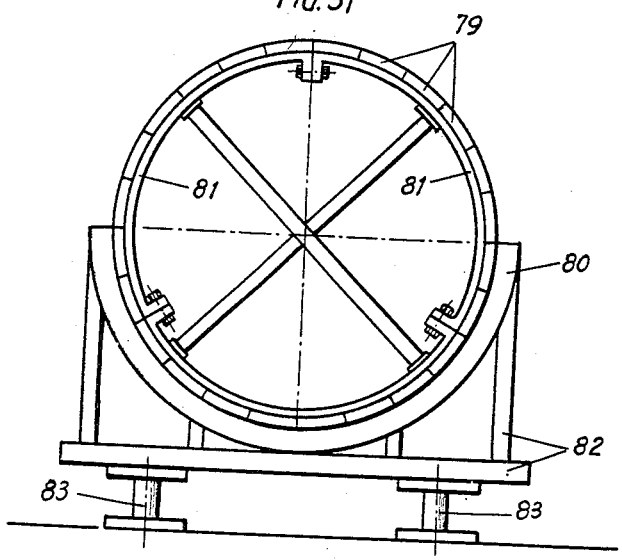
Figure 31 shows the method of manufacturing prefabricated structures from staves.

Concrete pipe, which is radially and longitudinally prestressed, may be obtained according to this invention by a further method of manufacture differing from the method commonly used and described above, by preliminarily manufacturing a non-reinforced type by a single casting. According to Figure 30, separate concrete sections 79 which are not reinforced or but lightly reinforced for instance by means of a wire net are manufactured, said net equalling in length the pipe to be manufactured, or a fraction thereof, of which the normal section is in the form of an arc of a circular rim. Upon hardening the sections 79 are juxtaposed like the staves of a barrel (Fig. 31), and bonded together by means of cement mortar. These operations are carried out by means of disassembleable bow members, formed by a number of metal shapes 80, in the form of half a circle, equalling in internal diameter the outer diameter of the pipe to be manufactured, and by a number of shapes 81 in the form of arcs of circles equalling in outer diameters the inner pipe diameter. Three or four shapes 80 are placed at suitable intervals and stiffened by a set of shapes 82 placeable on adjustable supports 83, whereupon the lower half cylinder of the pipe is manufactured. The shapes 81, duly stiffened and connected together, are placed on the manufactured half, and the upper half-cylinder is manufactured.

The sections are bonded by means of cement mortar, this being assisted by the form of the surfaces to be juxtaposed. Figure 32 shows the form of the edges of elements for the top apex 79a and for the lower apex 79b respectively, as well as for the sides of the pipe 79c. The various shapes have been developed in order to facilitate and accelerate the bonding joints by pouring cement mortar from the top.

In certain cases (Fig. 33), as when manufacturing long pipes on the spot, the sections are arranged in such manner that cross-joints 85 perpendicular to the pipe axes are staggered as shown in Fig. 33. This avoids discontinuities over a full pipe cross-section and affords an improved and more uniform behaviour of the structure from the standpoint of strength against secondary stresses. In this manner it is possible to manufacture pipes of indefinite length, deprived of actual joints, but for joints necessitated by heat expansion.

In order to avoid a lower strength at the longitudinal joint between the sections, these may be rectilinear, helically directed instead of being rectilinear, with the result that no generatrix of the cylinder coincides with a joint between two contiguous sections. The form and reciprocal arrangement of the helical sections in the pipe are shown in Figure 34.

Upon sufficient hardening of the bonding mortar, the hooping helical reinforcement is wound and stretched by the same processes described for monolithical pipes. The steps for longitudinal prestressing are the same as described in connection with monolithic pipes.

The above explanations concerning pipes apply to the manufacture of hollow circular cylindrical structures generally, such containers, for various fluids or solids (tanks, silos, etc.).

It will therefore be sufficient to give some hints to the manufacture of water reservoirs, which apply of course also to similar structures.

Cylindrical reservoirs may be manufactured by means of prefabricated sections or cast on the spot by successive sections by using preferably metallic disassemblable molds, which may be reutilised. In both cases the problem arises of stability and strength of the structure against external forces, more particularly wind, thrust during manufacture. Stability of the structure is ensured by radially prestretching it by successive sections, 1+4 meters high, according to the characteristics of the work, as the latter is being erected. This radial precompression by successive sections is effected as follows: The steel armature is wound on the cylindrical outer surface of the reservoir over a certain heigth, and its end is secured by passing it through steel rinks embedded in the concrete on casting, blocking it by means of small steel wedges 88. A first section of reinforcement is stretched, the stretching operation being stopped 4 or 5 turns from the end of the reinforcement, which is therefore anchored by friction as described above. A second ring of the cylinder is then laid and the hooping reinforcement is placed thereon, the successive steel wire rolls being bonded by welding or connected by vices. The hooping reinforcements for the last laid section are stretched. The longitudinal reinforcement is generally laid after completion of the reservoir and prestretching of the hooping wires, and is secured to the lower and upper ends of the reservoirs and stretched in the said manner as in prefabricated pipes. In some cases (Figs. 36 and 36a) instead of securing the reinforcements 89 to the lower end of the reservoir wall in the abovementioned manner, they may be secured to the reservoir base 90. For this purpose a number of irons 91 reinforcing the base are allowed to project therefrom and bent to a reversed U-shape. Reinforced concrete prism 92 may be inserted between the branches of said irons and of the steel wires 89 of the longitudinal reinforcement to be prestressed, in order to connect together the two systems of reinforcement.

By securing in the last described manner the lower ends of the longitudinal reinforcement, a monolithic structure of the reservoir and its base, hence a tight seal of the likewise prestressed joint base 93 are ensured. Upon stretching the longitudinal reinforcement, the various connections between the longitudinal reinforcement of the reservoir and the reinforcement of the infrastructure are protected and blocked by casting along the full base contour a strap 94 of concrete. The hooping and longitudinal wires are protected by means of a gunite casting of suitable thickness in a manner similar to tubes. The above statements concerning prestressing of cylindrical structures of circular section may be suited to prestressing of structures confined by convex surfaces of any form. More particularly, the invention may provide for prestressing hollow spherical structures of concrete or the like. It is known that the spherical form or forms resembled thereto, for instance those having a surface of the shape taken by a drop of a high superficial tension liquid resting on a plane, are best suited for containers, for fluids at an almost uniform pressure throughout, such as compressed gases. In the case (Figure 37) of a hollow concrete ball or sphere, the desired prestressing may be obtained in its walls by a double system of reinforcement. One set of reinforcements consists of two twined wires 95, of which one end is secured to a point P of the sphere surface, and which are wound thereon, so as to intersect all the meridians of the sphere passing through P under a constant angle. The other end P' of the wires is obviously at the antipodes of the point P. The second system of reinforcements 96 has its end secured to a point Q belonging to the parallel of largest development (equatorial parallel) of the sphere having as its poles the points PP' and is wound on the sphere similarly to the first system, that is so as to intersect all the meridians issuing from Q under a constant angle equalling the former. The other end Q' of said reinforcement is obviously at the antipodes of the point Q. Previously stretching of the reinforcement is effected by applying external forces which deflect the reinforcement from its primitive position causing the elongation of its axis required for attaining the desired tensions. These forces are then replaced by internal fastenings of the type described above. In this case the outer surface of the sphere to be prestressed shall be provided with a system of spacer projection performing the same functions as the above described projections. Instead of this type of twined wire reinforcement, which falls by its characteristics under the first general diagram shown in Figure 4, it is possible to adopt a single wire type of reinforcement. The wires are then wound on the sphere in a helical form as shown in Figure 37, but are stretched according to the second general diagram shown in Figure 5. The spacer projections merely perform a temporary function, and may be replaced by steel shapes having recesses in the form of circles of which the inner diameter equals the outer diameter of the sphere. These shapes are placed along the meridians of the sphere and perform a function similar to that described in the previous preceding cases.

The above statement concerning prestressing of structures of cementitious structures may obviously apply to prestressing of similar structures of other materials, such as stone, wood, glass, steel, bricks, etc. without departing from the scope of this invention.

What I claim is:

1. A process of prestressing rigid bodies comprising the steps of arranging in the body a metallic reinforcement bonded to the body at its ends and initially composed of a plurality of parallel directed wires, maintaining the spacing between two contiguous parallel reinforcing wires constant at suitably spaced points by spacer means, applying to regions of contiguous parallel reinforcing wires, equally spaced from said spacer members, outer forces directed tangentially of the surface of the body to be prestressed and perpendicularly to the reinforcement at said regions, so as to deform the portion of the reinforcing wire between said spacers until the desired stressed condition is reached in the reinforcement, hence in said rigid body and bonding the reinforcing wire to the other at the same points to which said forces have been applied and so as to permanently maintain deformation and the prestressed condition initially imposed upon the reinforcement.

2. A process of prestressing rigid bodies comprising the steps of arranging in the body a metallic reinforcement bonded to the body at its ends and initially composed of a plurality of parallel directed wires, maintaining the spacing between two contiguous reinforcing wires constant at suitable spaced points by projections provided at intervals on the surface of the rigid body, applying to regions of contiguous parallel reinforcing wires, equally spaced from said projections, outer forces directed tangentially of the surface of the body to be prestressed and perpendicularly to the reinforcing wires at said regions, so as to deform the portions of the reinforcing wires between said projections until the desired stressed condition is reached in the reinforcement, hence in said rigid body, by fastening together the points of the tensioned wires to which said forces have been applied so as to permanently maintain deformation, and the prestressed condition initially imposed upon the rigid body.

3. A process of prestressing rigid bodies comprising the steps of arranging in the body a metallic reinforcement bonded to the body at its ends and initially composed of a plurality of parallel directed wires, maintaining the spacing between two contiguous reinforcing wires constant at suitably spaced points by removable metal elements provided with recesses situated at intervals equalling the original distances between two contiguous wires and receiving the reinforcing wires, applying to regions of contiguous parallel reinforcing wires, equally spaced from said metal spacer elements, outer forces directed tangentially of the surface of the body to be prestressed and perpendicularly to the reinforcement at said regions, so as to deform the portions of the reinforcing wires between said spacers until the desired stressed condition is reached in said wires hence in said rigid body, by fastening together the points of the tensioned wires to which said forces have been applied so as to permanently maintain deformation, and the prestressed condition initially imposed upon the rigid body.

4. A process of prestressing rigid cylindrical bodies comprising the steps of arranging in the body a metallic reinforcement bonded to the body at its ends and initially composed of a plurality of substantially parallel directed wires forming a system of helices of high inclination wound about the cylindrical body, maintaining the spacing between two contiguous substantially parallel reinforcing wires constant at suitably spaced points by projections provided at intervals in the curved surface of the rigid body, applying to regions of contiguous reinforcing wires, equally spaced from said projections, outer forces directed tangentially of the surface of the body to be prestressed and perpendicularly to the reinforcing wires at said regions, so as to deform the portion of the reinforcing wire between said projections until the desired stressed condition is reached in the reinforcing wires and in said rigid body, securing the wires together by bonds provided at the same points to which said forces have been applied and such as to permanently maintain deformation, and the prestressed condition initially imposed upon the rigid body.

5. A process of prestressing rigid cylindrical bodies comprising the steps of arranging in the body a metallic reinforcement bonded to the body at its ends and initially composed of a plurality of substantially parallel directed wires forming a system of helices of high inclination wound about the cylindrical body, maintaining the spacing between two contiguous substantially parallel reinforcing wires constant at suitably spaced points by means of removable metal spacer elements provided with recesses situated at intervals equalling the original distances between two contiguous wires and receiving the reinforcing wires, applying to regions of contiguous parallel reinforcing wires, equally spaced from said metal elements outer forces directed tangentially of the surface of the body to be prestressed and perpendicularly to the reinforcement at said regions, so as to deform the portion of the reinforcing wires between said spacers until the desired stressed condition is reached in said wires, and in said rigid body, fastening together the points of the tensioned wires to which said forces have been applied so as to permanently maintain deformation, and the prestressed condition initially imposed upon the rigid body.

References Cited in the file of this patent

UNITED STATES PATENTS

| Number | Name | Date |
| --- | --- | --- |
| 619,710 | Baldwin | Feb. 21, 1899 |
| 772,117 | Winslow | Oct. 1, 1904 |
| 1,281,201 | Peterson | Oct. 8, 1918 |
| 2,048,253 | Freyssinet | July 21, 1936 |
| 2,267,619 | Strom | Dec. 23, 1941 |
| 2,376,831 | Stearns | May 22, 1945 |
| 2,447,155 | Brickman | Aug. 17, 1948 |
| 2,461,030 | Brickman | Feb. 8, 1949 |
| 2,561,581 | Macerata | July 24, 1951 |
| 2,579,183 | Freyssinet | Dec. 18, 1951 |